(12) United States Patent
Fukasaku et al.

(10) Patent No.: US 7,256,521 B2
(45) Date of Patent: Aug. 14, 2007

(54) MOTOR OR GENERATOR AND METHOD OF PRODUCING THE SAME

(75) Inventors: Hiroshi Fukasaku, Aichi-ken (JP); Kiyoshi Uetsuji, Aichi-ken (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 27 days.

(21) Appl. No.: 10/965,320

(22) Filed: Oct. 14, 2004

(65) Prior Publication Data

US 2005/0082924 A1   Apr. 21, 2005

(30) Foreign Application Priority Data

Oct. 20, 2003  (JP) .............................. 2003-359570

(51) Int. Cl.
*H02K 11/00* (2006.01)

(52) U.S. Cl. .......................... 310/71; 310/179; 310/180

(58) Field of Classification Search ................. 310/71, 310/179, 180, 200, 201, 208, 216, 254
See application file for complete search history.

(56) References Cited

U.S. PATENT DOCUMENTS

| | | | | |
|---|---|---|---|---|
| 2,055,595 A | * | 9/1936 | Surjaninoff | 310/87 |
| 3,728,567 A | * | 4/1973 | Picmaus | 310/198 |
| 5,327,637 A | * | 7/1994 | Breitenbach et al. | 29/596 |

FOREIGN PATENT DOCUMENTS

| | | |
|---|---|---|
| JP | 58-033945 | 2/1983 |
| JP | 09-191588 | 7/1997 |
| JP | 2002-186212 | 6/2002 |
| JP | 2003-047189 | 2/2003 |

* cited by examiner

*Primary Examiner*—Thanh Lam
(74) *Attorney, Agent, or Firm*—Morgan & Finnegan L.L.P.

(57) ABSTRACT

A plurality of slots is provided at a stator core. A cable component is formed by bundling a plurality of conducting wires and connectors are mounted on both ends. The cable component is inserted into corresponding slot so as to cross over the corresponding plurality of slots and then a coil is formed by connecting both ends of the cable component.

10 Claims, 10 Drawing Sheets

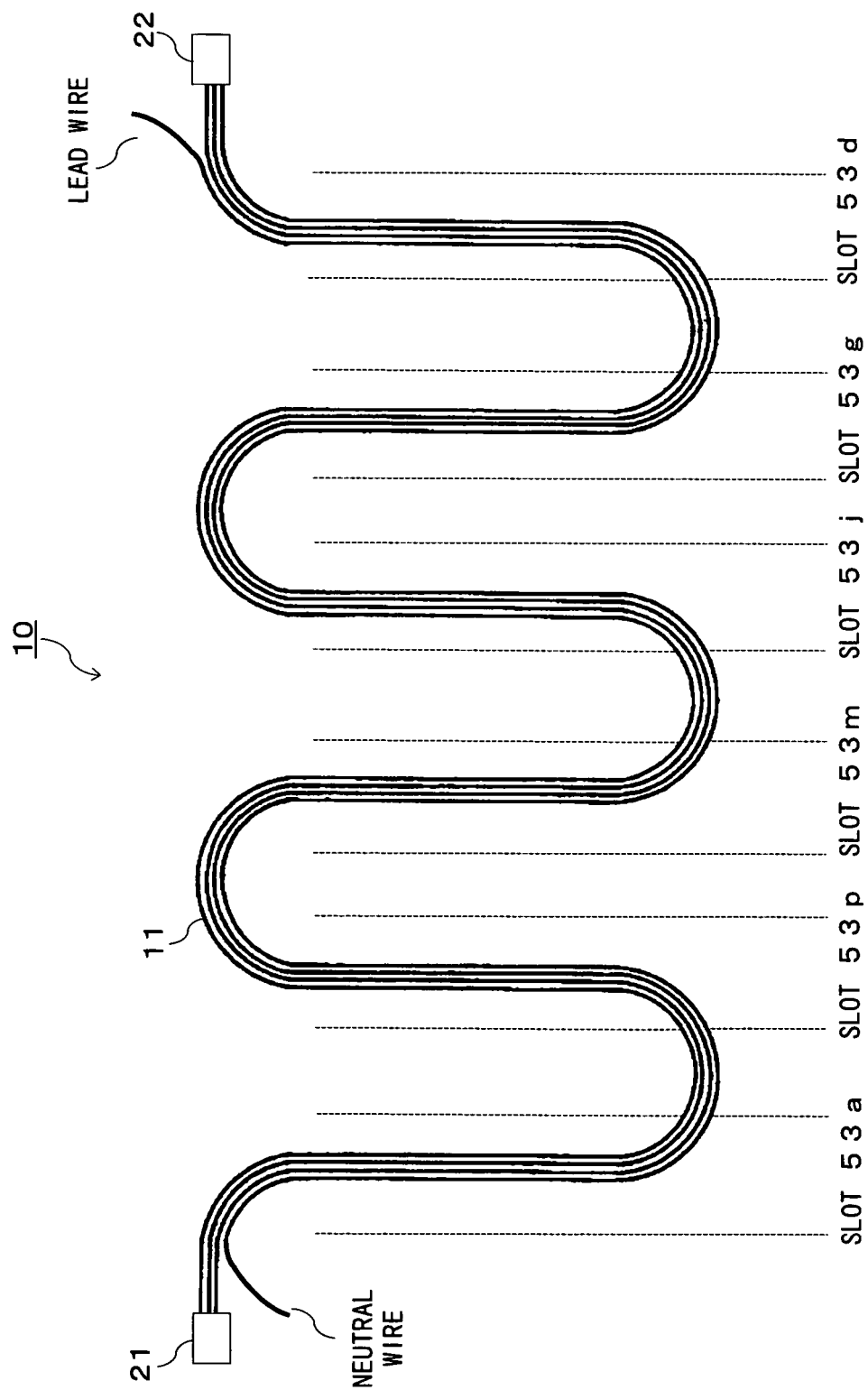
F I G. 1

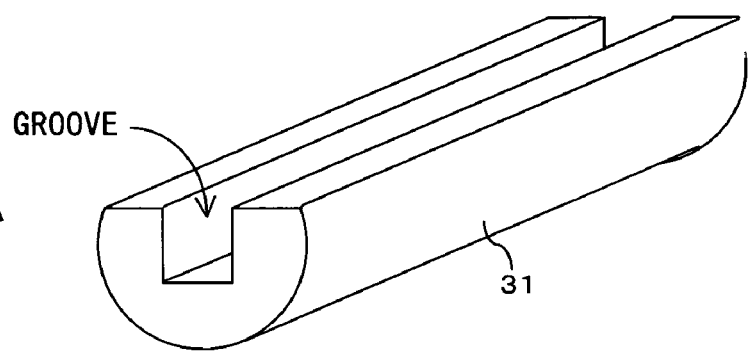
F I G. 2A
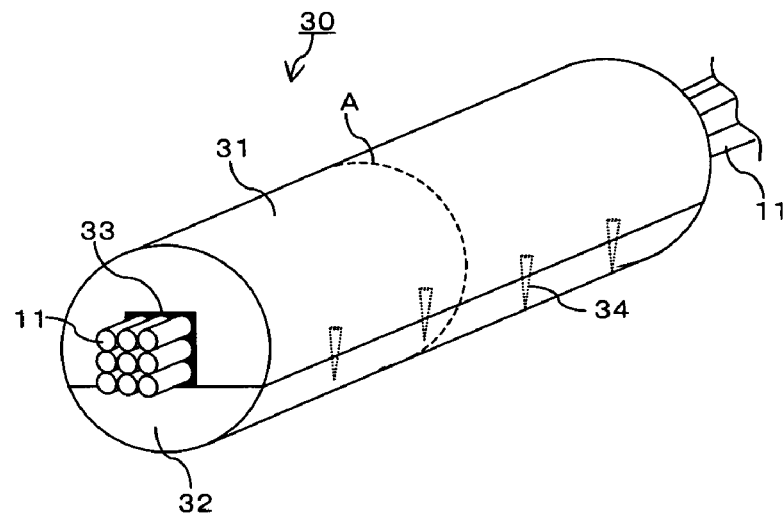
F I G. 2B
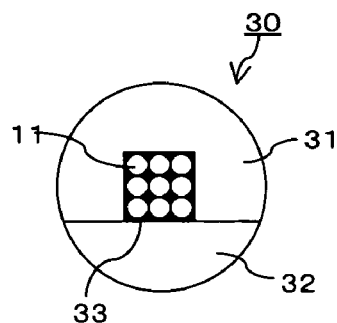
F I G. 2C
(CROSS-SECTION VIEW ON PLANE A)

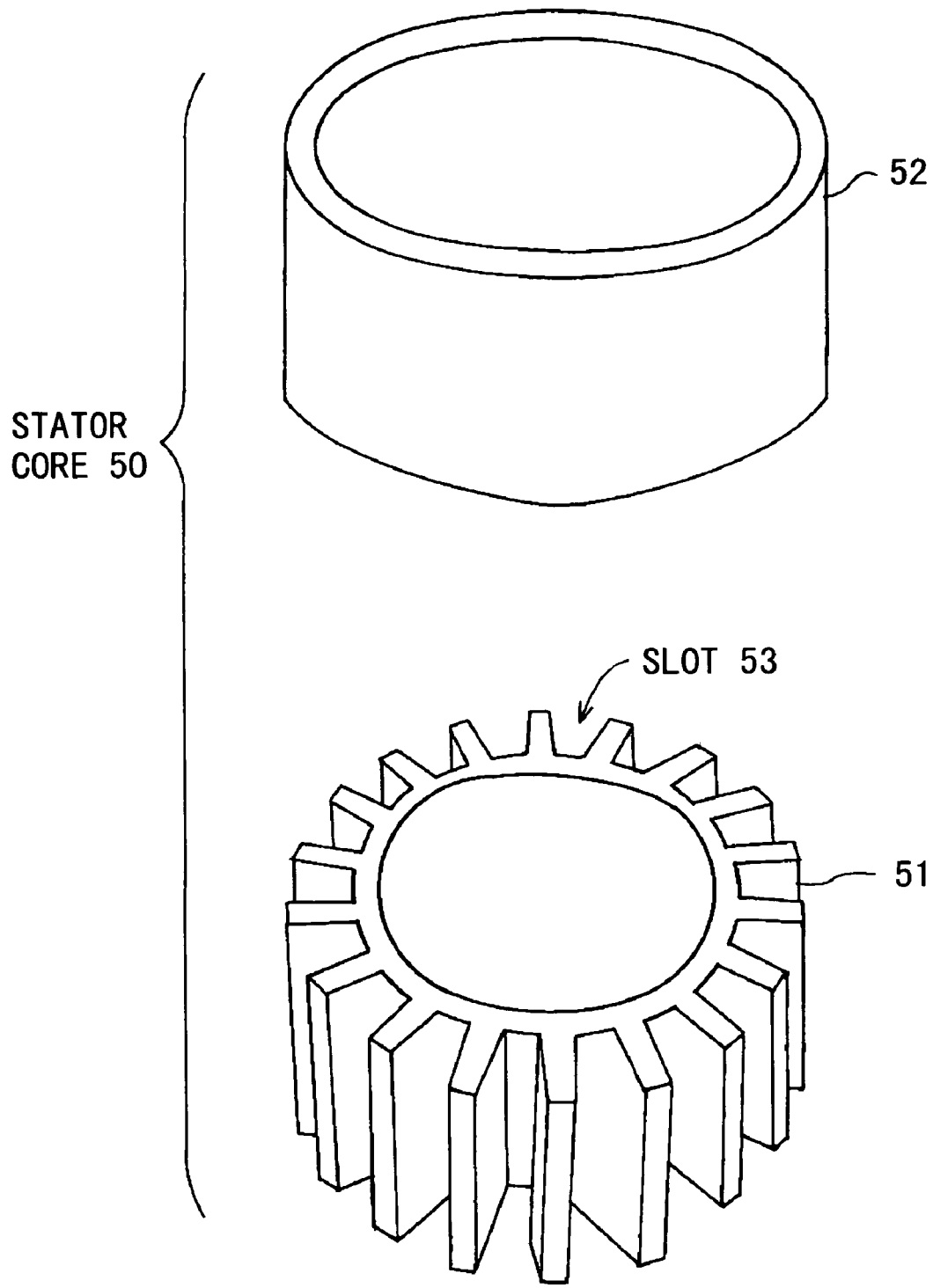
F I G. 4

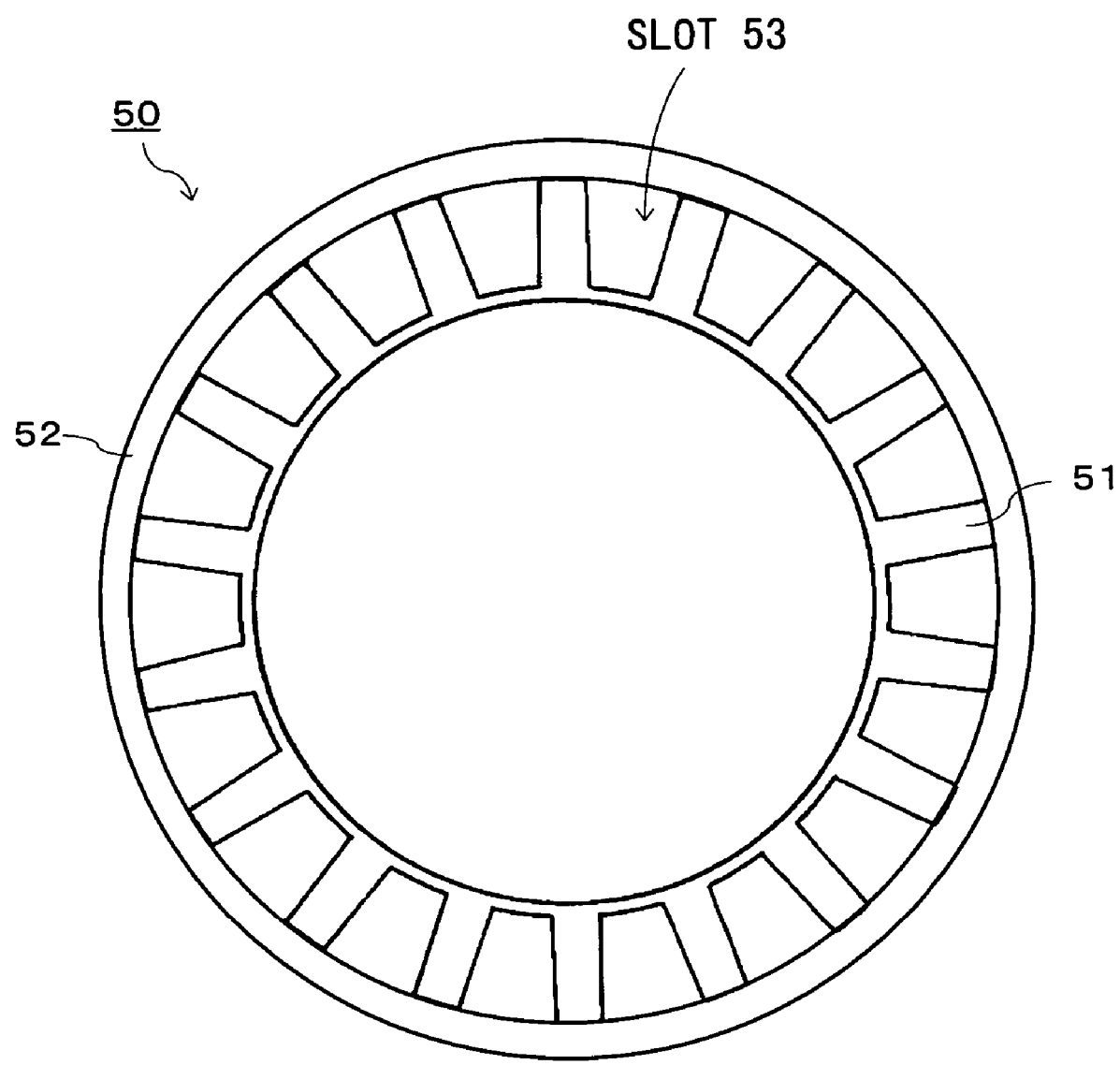
F I G. 5

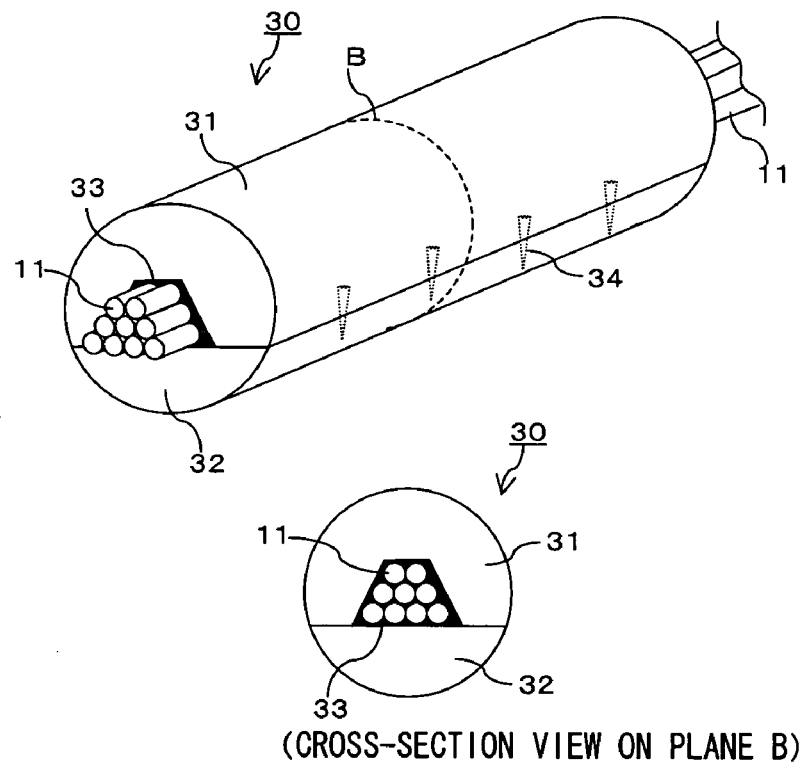
F I G. 6 A
(CROSS-SECTION VIEW ON PLANE B)
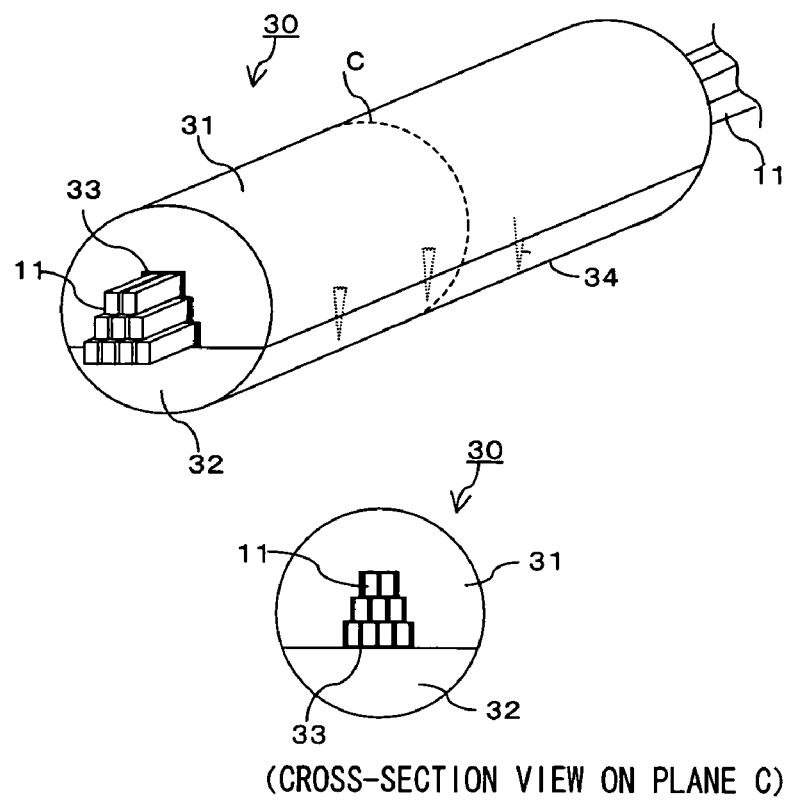
F I G. 6 B
(CROSS-SECTION VIEW ON PLANE C)

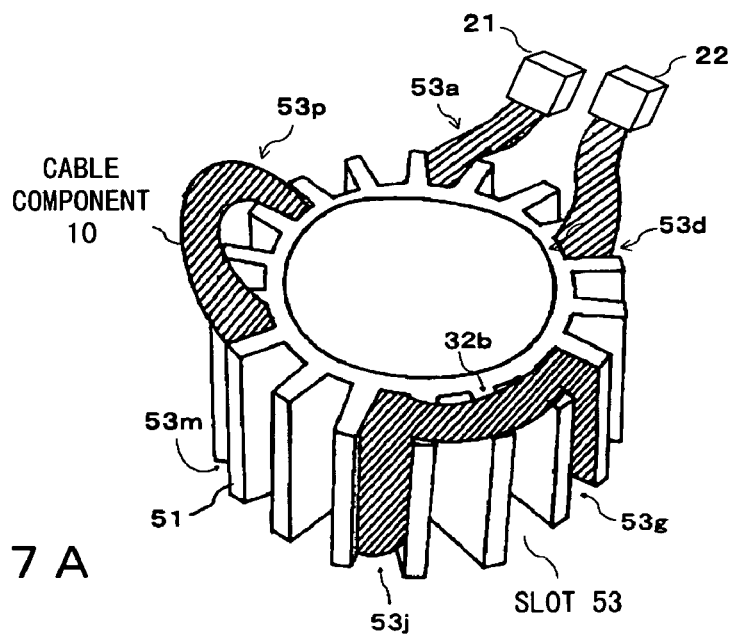
F I G. 7A
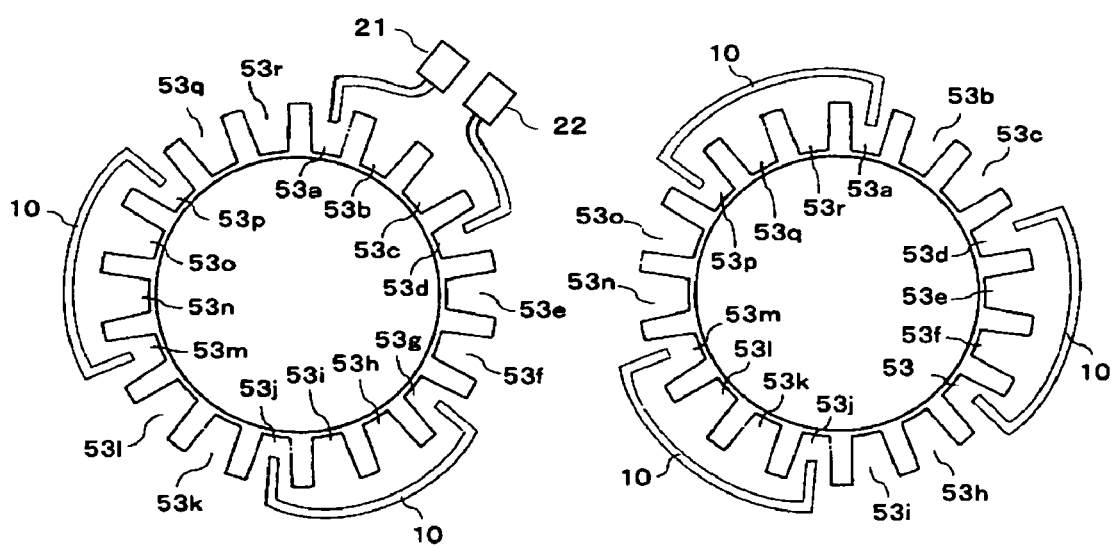
F I G. 7B  F I G. 7C

MOTOR OR GENERATOR AND METHOD OF PRODUCING THE SAME

BACKGROUND OF THE INVENTION

1. Field of the Invention

The present invention relates to a motor and a generator of which the armature is wound by a coil and also relates to a method thereof.

2. Description of the Related Art

A rotating electrical unit has been conventionally and widely used in various fields. Here, the rotating electrical unit includes a motor and a generator. The use of the rotating electrical unit is not limited but here it is used as, for example, a motor for driving the compressor of an air conditioner, a motor for running an electric vehicle (including a hybrid car), a generator mounted on a car, etc.

The rotating electrical unit is generally provided with a coil for generating a magnetic field (in the case of a generator, a coil for generating electromotive force in accordance with the change of a flux). The following method is well known as a method of forming a conventional wire.

For example, in a rotating electrical unit described in patent document 1, a coil is formed by repeatedly winding a conductor wire around the slot of a stator. This stator includes a plurality of stator pieces and these stator pieces are combined after a coil is formed for each stator piece. Therefore, this method has a merit such that a winding operation becomes easier in comparison with a method of winding a conductor wire around the slot provided on a cylindrical stator core.

In addition, in patent document 2, a technology called insert method is described. In the insert method, a coil is produced in advance by winding one conductor wire several times around a ring-shaped frame, etc. and this ring-shaped coil is inserted into the slot corresponding to a stator core using a device called an inserter. According to this insert method, since a conductor wire need not be wound directly around a slot of the stator core, the operation of forming a coil becomes easier.

[Patent document 1]

Japanese patent laid-open application publication 9-191588 (FIGS. 1 and 2, paragraphs 0023 to 0030).

[Patent document 2]

Japanese patent laid-open application publication 58-33945 (pages 1 and 2).

In a case where a coil is formed by winding a conductor wire directly around a slot provided at a stator core (especially, in a case where a slot is provided on an inner circumference side of a cylindrical stator core), the labor for a winding operation increases. In the method described in patent document 1, this problem is alleviated. According to the method described in patent document 1, however, it is interpreted that the configuration of a stator core is complicated and the coil is limited to a concentrated winding.

In the insert method described in the patent document 2, an inserter itself is a relatively large-scale and also expensive device. Especially in a case where a stator core has a long cylindrical shape, a coil can be hardly inserted into the corresponding slot.

SUMMARY OF THE INVENTION

The present invention aims at easily configuring the coil of a motor and a generator.

The production method of a motor or a generator includes a step of producing a cable component by bundling a plurality of conductor wires, a step of inserting the cable component into the corresponding slot so as to cross over a plurality of slots provided at an armature iron core and a step of forming a coil of an armature by electrically connecting ends of the plurality of conductor wires using a connector in such a way that the plurality of conductor wires are serially connected.

According to this production method, a cable component that is obtained by bundling a plurality of conductor wires is installed on the armature iron core and then a coil is formed by electrically connecting both ends of the cable component. Therefore, a coil can be formed without winding a conductor wire directly around the armature iron core. Furthermore, since a cable component is inserted into the corresponding slot so as to cross over some slots, a large-scale device such as a device used in the insert method is not required.

In a process of producing the cable component, the plurality of conductor wires may be arranged in such away that the cross-section shape of the cable component is approximately identical to that of the slot. In this case, since the lamination (or density) factor of the conductor wire increases in a slot, the efficiency of a motor or a generator increases. Meanwhile, according to the production method of the present invention, since the pre-produced cable component is installed at the armature iron core, it is easy to align a plurality of conductor wires so as to approximately match with the cross-section shape of the slot.

In the production method, the cable component may be inserted into the corresponding slot so as to cross over a plurality of slots in such a way that the coil to be formed becomes a wave winding. According to this method, a wave winding coil can be easily configured.

A motor and a generator of the present invention are configured to include an armature wound by a conductor wire. The armature includes an armature iron core provided with a plurality of slots, a cable component, which is obtained by bundling a plurality of conductor wires, to be inserted into the corresponding slot so as to cross over a plurality of slots provided at the armature iron core and a connector for electrically connecting the ends of the plurality of conductor wires in such a way that the plurality of conductor wires are serially connected.

In the motor and the generator, the plurality of conductor wires may be arranged in such a way that the cross-section shape of the cable component is approximately identical to that of the slot. In addition, a flat conductor wire may be selected as each of the plurality of conductor wires.

The motor and generator (or armature) according to the present invention can obtain the same effect by implementing the above-mentioned production method and the same operation.

According to the present invention, a cable component including a plurality of conductor wires is provided at the slot of an armature iron core and then a coil is formed by electrically connecting both ends of the cable component. Therefore, the operation of forming a coil is simple and accordingly expensive and large-scale equipment is not required.

Furthermore, according to the present invention, since a cable component to be inserted into the slot of an armature iron core can be separately formed, it is easy to align a plurality of conductor wires so as to approximately match with a cross-section shape of the slot. Accordingly, the lamination factor of conductor wires can be increased in the slot so that the efficiency of a motor or a generator can be improved.

BRIEF DESCRIPTION OF THE DRAWINGS

FIG. 1 is a pattern diagram showing a cable component used as a coil in a rotating electrical unit of the embodiment of the present invention;

FIGS. 2A to 2C show production methods of a cable component;

FIG. 4 is a decomposition perspective view of the stator core of another embodiment of the present invention;

FIG. 5 shows the stator core viewed from above;

FIGS. 6A and 6B show embodiment of the production method of a cable component to be provided at a slot of the stator core shown in FIGS. 4 and 5;

FIGS. 7A to 7C show the condition in which a cable component is inserted into the slot of a stator;

DESCRIPTION OF THE PREFERRED EMBODIMENTS

Figure 3:
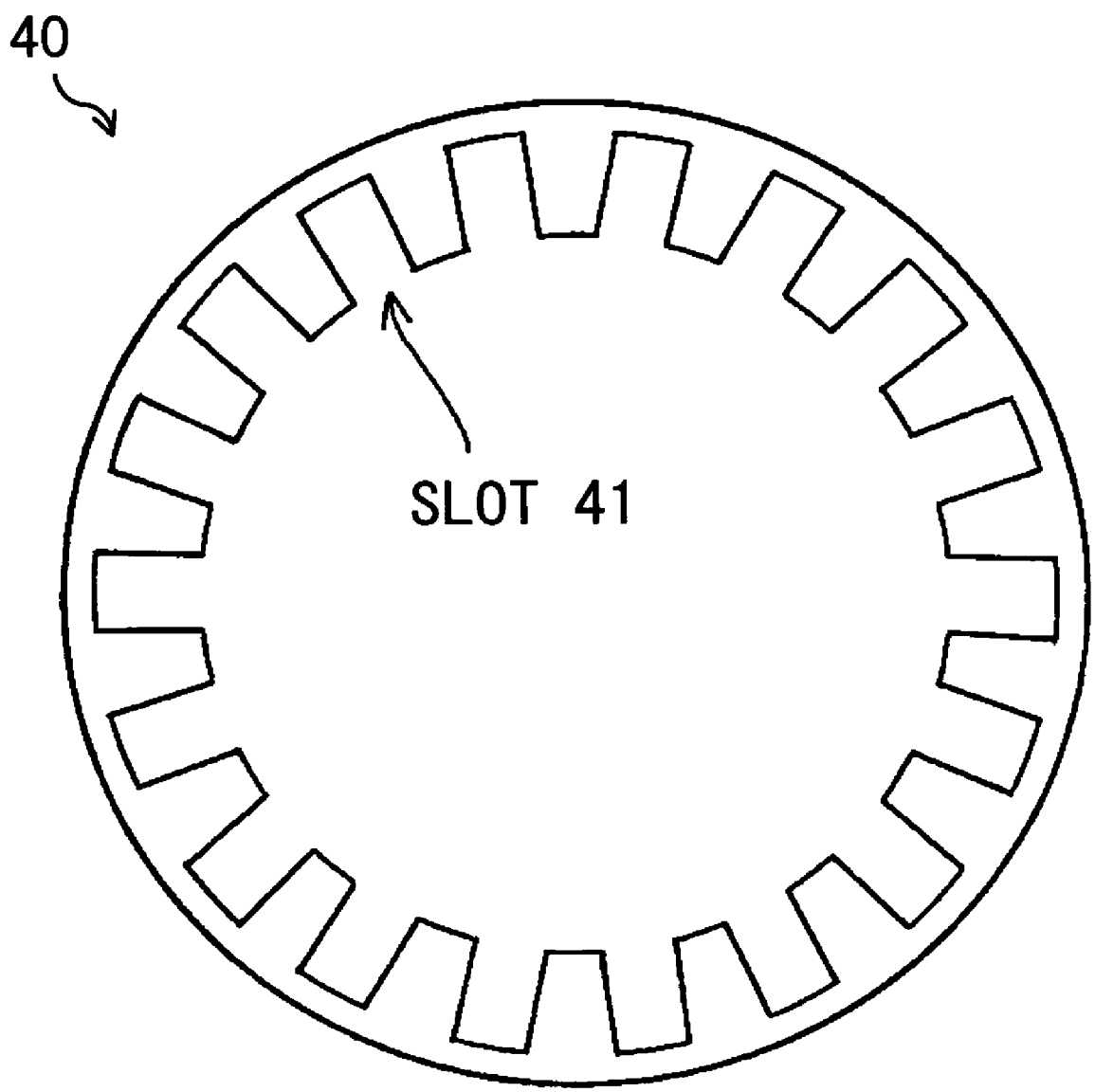
FIG. 3 shows the cross-section view of one example of a stator core provided with the cable component shown in FIG. 2.

The following is the explanation of the embodiment of the present invention in reference to the drawings. The explanation is made for the case where the present invention is applied to a synchronous machine as a rotating electrical unit. Here, the rotating electrical unit of the embodiment includes a stator and a rotor each functioning as an armature similarly to a general rotating electrical unit, but the configuration of the rotor is not characteristic. Therefore, the configuration of the rotor is omitted. Incidentally, steps other than the step of producing a stator may be realized by a general technology or a publicly known technology.

FIG. 1 is a pattern diagram showing a cable component used as a coil in a rotating electrical unit of the embodiment. Meanwhile, the rotating electrical unit of the embodiment includes a motor and a generator. The following is the explanation of the case where the rotating electrical unit is a three-phase rotating electrical unit and the number of poles of each phase is "6".

A cable component 10 is formed by bundling a plurality of conductor wires 11. Here, each conductor wire 11 is insulation-coated. In consideration that the cable component 10 is installed on a stator, the length of the conductor wire 11 on an inner-circumference side of the stator and that on an outer-circumference side of the stator are slightly different, but they are approximately the same. Furthermore, the cross-section area of each conductor wire 11 is substantially the same.

The cross-section shape of each conductor wire 11 is, for example, circular (or substantially circular) or rectangular (or substantially rectangular). Here, a plurality of conductor wires having the same cross-section shape are bundled to form the cable component 10, but conductor wires having different cross-section shapes may be mixed. Hereinafter, a conductor wire having a circular cross-section shape is sometimes named a "circular conductor wire", while that having a rectangular or approximately rectangular cross-section is sometimes named a "flat conductor wire".

At the both ends of the cable component 10, connectors 21 and 22 are respectively fixed. The explanation about these connectors 21 and 22 is given in detail later.

FIGS. 2A to 2C show one example of a production method of the cable component 10. Here, the embodiment in the case where nine circular conductor wires are aligned to be bundled in such a way that the cross-section shape of the cable component 10 becomes approximately square.

A bundling tool 30 for bundling a plurality of conductor wires includes a set of tool members 31 and 32. At this tool member 31, a groove expanding in the longitudinal direction is formed as shown in FIG. 2A. Here, the cross-section shape of the groove is approximately square. Therefore, when the tool members 31 and 32 are combined, the cross-section shape of the connected members is approximately square as shown in FIGS. 2B and 2C, and a porosity 33 expanding in a longitudinal direction of the bundling tool 30 is formed.

The plurality of conductor wires 11 is inserted into the groove of the tool member 31 in a predetermined order in order that the wires are aligned with each other. At this time, a plurality of bundling tools 30 are arranged at predetermined intervals and a plurality of conductor wires 11 is inserted into the groove of each bundling tool 30. Then, under the condition in which a plurality of conductor wires 11 is inserted into the groove of the tool member 31, the tool members 31 and 32 are combined and the members are fixed to each other using a screw 34, etc. Thus, the cable component having a square cross-section is formed.

FIG. 3 shows the cross-section of one example of a stator core that functions as an armature iron core on which the cable component 10 as shown in FIGS. 2A to 2C is installed. The cross-section shape of a slot 41 provided on the stator core 40 is approximately rectangle (or square). The cable component 10 is configured in such a way that the cross-section is approximately identical to that of the slot 41. Therefore, when the cable component 10 is inserted into the slot 41 corresponding to the stator core 40 based on the procedures that are explained later, the lamination factor of conductor wires is increased in the slot.

FIG. 4 is a decomposition oblique perspective view of a stator core of another embodiment. A stator core 50 includes an inner-circumference member 51 and an outer-circumference member 52 as shown in FIG. 4. The inner-circumference member 51 is provided with a plurality of protruding portions that respectively project in a radial direction. Each slot 53 is formed between these protruding portions. On the other hand, the outer-circumference member 52 is shaped like a cylinder and fixed to the inner-circumference member 51 to wrap this member.

FIG. 5 is a diagram when the stator core 50 is viewed from the top. Here, the diagram shows a condition in which the outer-circumference member 52 is fixed on the outer side of the inner-circumference member 51. The stator core 50 is provided with a plurality (in this example, 18 pieces) of slots 53. The cross-section shape of the slot 53 is a trapezoid (or fan shape) in this example.

FIGS. 6A and 6B show embodiments of a production method of a cable component to be installed at a slot of the stator core as shown in FIGS. 4 and 5. That is, the drawings show the embodiments in the case where nine conductor wires are aligned and bundled in such a way that the cross-section shape of the cable component 10 becomes a trapezoid.

In respect of the bundle tool 30 as shown in FIG. 6A, the cross-section shape of the porosity 33 for containing a plurality of conductor wires 11 is a trapezoid. Therefore, by aligning nine conductor wires in the porosity 33, the cross-section shape of the cable component 10 approximately becomes trapezoidal. That is, a plurality of conductor wires 11 is arranged in such a way that the cross-section shape of the cable component 10 is approximately identical to the cross-section shape of the slot 53.

In the example as shown in FIG. 6B, a flat conductor wire is used as the conductor wire 11, but the fundamental configuration is identical to the example as shown in FIG. 6A. When the cable component 10 is formed using flat conductor wires, the wires can be aligned with smaller space in comparison with the case where the component is formed using circular conductor wires. Accordingly, in the case where the cable component 10 is formed using flat conductor wires, the lamination factor of the conductor wires further increases in a slot when the cable component 10 is inserted into the slot of a stator core.

If the lamination factor of the conductor wires is increased in a slot, the efficiency of a rotating electrical unit increases as the ordinary skilled person in the art well knows.

The following is the explanation of procedures for installing the cable component 10 at a stator core in reference to FIGS. 1 and 7A to 7C. In the following explanation, it is assumed that the cable component 10 is installed at the stator core 50 as shown in FIGS. 4 and 5.

FIG. 7 shows a condition in which the cable component 10 is inserted into the corresponding slot of the stator core. Here, FIGS. 7A, 7B and 7C are an oblique perspective view, a pattern diagram of a cable component installed on the topside of the stator core and a pattern diagram of a cable component installed on the downside of the stator core, respectively. In order to clarify the drawings, the outer-circumference member 52 is omitted here. Furthermore, in order to realize a three-phase rotating electrical unit, three cable components 10 must be installed at the stator core, but only one cable component 10 is drawn in these drawings.

In FIGS. 7A to 7C, the stator cores as shown in FIGS. 4 and 5 are used and the cable component 10 is inserted into the corresponding slot from the outer-circumference side of the stator core 50. In the case of the embodiment as shown in FIG. 3, the cable component 10 is inserted into the corresponding slot from the inner-circumference side, which is not shown in the drawing.

The thus-produced cable components 10 are inserted into six corresponding slots at intervals of three slots. Specifically, one of the cable components 10 is sequentially inserted into the slots 13a, 13p, 13m, 13j, 13g and 13d from among eighteen slots 13a to 13r provided at the stator core 50. At this time, in the examples as shown in FIGS. 7A to 7C, one end of the cable component 10 (the end to which the connector 21 is fixed) is pulled out from the upper end of a slot 53a, while the other end of the cable component 10 (the end to which the connector 22 is fixed) is pulled out from the upper end of a slot 53d. The cable component 10 is installed to form a wave winding according to the following route. Connector 21→upper end of slot 53a→slot 53a→lower end of slot 53a→lower end of slot 53p→slot 53p→upper end of slot 53p→upper end of slot 53m→slot 53m→lower end of slot 53m→lower end of slot 53j→slot 53j→upper end of 53j→upper end of slot 53g→slot 53g→lower end of slot 53g→lower end of slot 53d→slot 53d→upper end of slot 53d→connector 22.

Subsequently, a coil is formed by connecting both ends of the cable component 10 installed at the stator core 50. The following is the explanation of a method of forming a coil in reference to FIG. 8. In the example shown in FIG. 8, the cable component 10 is formed by combining nine conductor wires 11a to 11i.

The connector 21 is fixed to one end of the cable component 10. The ends of the conductor wires 11a to 11h among nine conductor wires 11a to 11i configuring the cable component 10 are connected to terminals 21a to 21h of the connector 21, respectively. The end of the conductor wire 11i is configured to protrude outside without being connected to the connector 21.

The connector 22 is fixed to the other end of the cable component 10. The ends of the conductor wires 11b to 11i among nine conductor wires 11a to 11i configuring the cable component 10 are connected to terminals 22b to 22i of the connector 22, respectively. The end of the conductor wire 11a is pulled outside without being connected to the connector 22.

The connectors 21 and 22 are connected to each other via a connector 23. The connector 23 is configured to electrically connect the terminals 21a to 21h of the connector 21 with terminals 22b to 22i of the connector 22, respectively. Therefore, if the connectors 21 and 22 are connected via the connector 23, nine conductor wires 11a to 11i are electrically and serially connected so that one conductor wire is formed.

The cable component 10 is installed so as to cross over the predetermined number of slots provided at the stator core 50 as explained in reference to FIGS. 7A to 7C. Therefore, if a long conductor wire such that the conductor wires 11a to 11i are serially connected is formed by electrically connecting both ends of the cable component 10 in an appropriate manner, a coil wound around a plurality of slots of the stator core 50 is configured. At this time, in the embodiment, the cable component 10 includes nine conductor wires 11 so that wave winding coils of nine turns are configured.

In addition, two other cable components are installed at the stator core 50 and a coil is configured in the same method. Then, after the cable component 10 (that is, a coil) is installed at the inner-circumference member 51 of the stator core 50 in this way, the outer-circumference member 52 is placed to wrap the inner-circumference member 51. Thus, the stator of a rotating electrical unit is configured.

In this way, in the production method of a rotating electrical unit of the embodiment of the present invention, the cable component 10 obtained by bundling a plurality of conductor wires 11 is installed at the slot of a stator core and both ends of the cable component 10 are electrically connected so as to configure a coil. At this time, the operation of installing the cable component 10 at the corresponding slot is much easier in comparison with the operation of directly winding a conductor wire. Furthermore, in a production method of the embodiment of the present invention, an expensive device as required in the insert method is not required.

Furthermore, in the production method of the embodiment of the present invention, since the preliminarily produced cable component 10 is installed around the slot of a stator core, a plurality of conductor wires 11 is easily aligned so as to approximately match with the cross-section shape of the slot. Therefore, the lamination factor of the conductor wires can be increased in a slot, thereby improving the efficiency of rotating electrical unit.

According to the above-mentioned embodiment, the connectors 21 and 22 are fixed to the ends of the cable component 10 and the connector 23 connects the connectors 21 and 22, but the present invention is not limited to this configuration. That is, the configuration as shown in, for example, FIGS. 9A and 9B can be adopted.

Figure 9A:
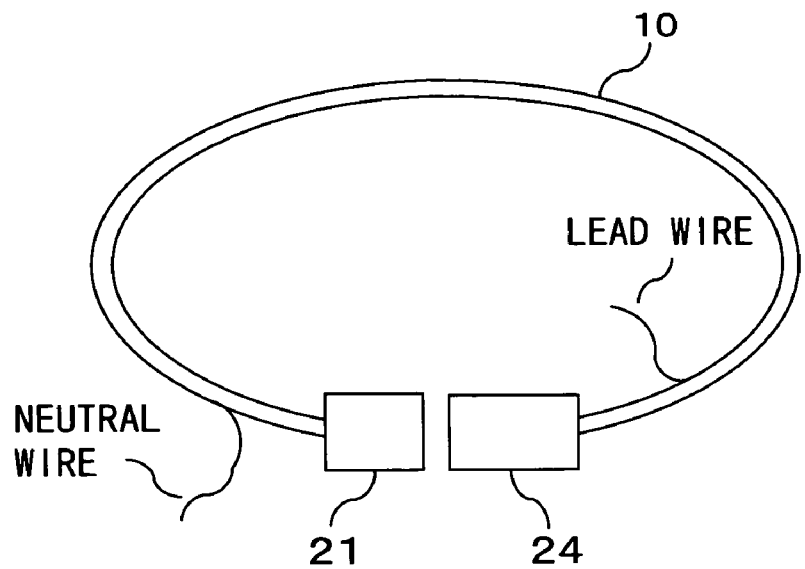
FIGS. 9A and 9B show other examples of the connection method of ends of a cable component.

In the example as shown in FIG. 9A, the connector 21 and a connector 24 are fixed to both ends of the cable component 10. Here, the connector 24 is obtained by integrally forming the connectors 22 and 23. Accordingly, by connecting the connector 21 and the connector 24, a coil is formed.

Figure 8:
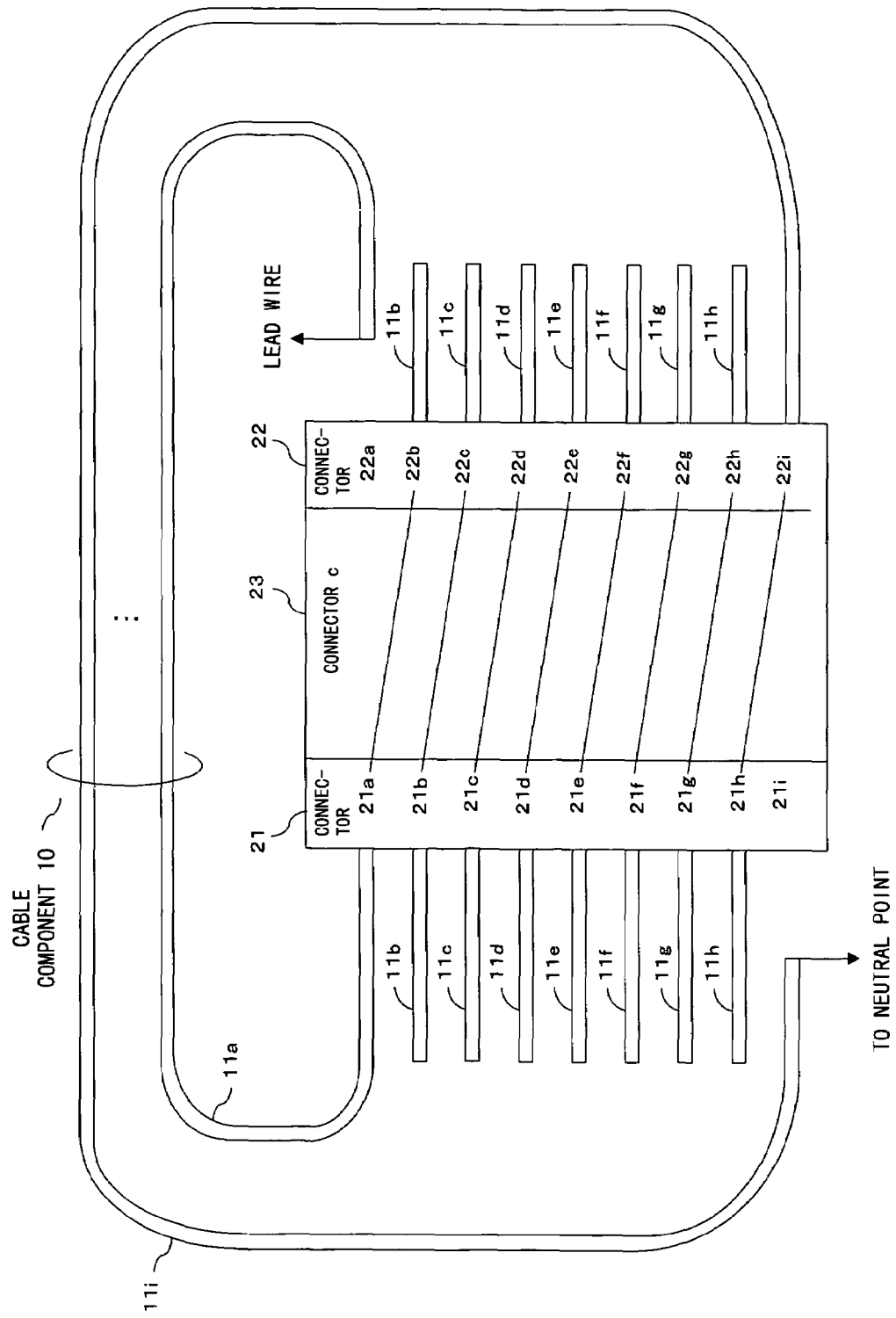
FIG. 8 explains a method of forming a coil using a cable component.
Figure 9B:
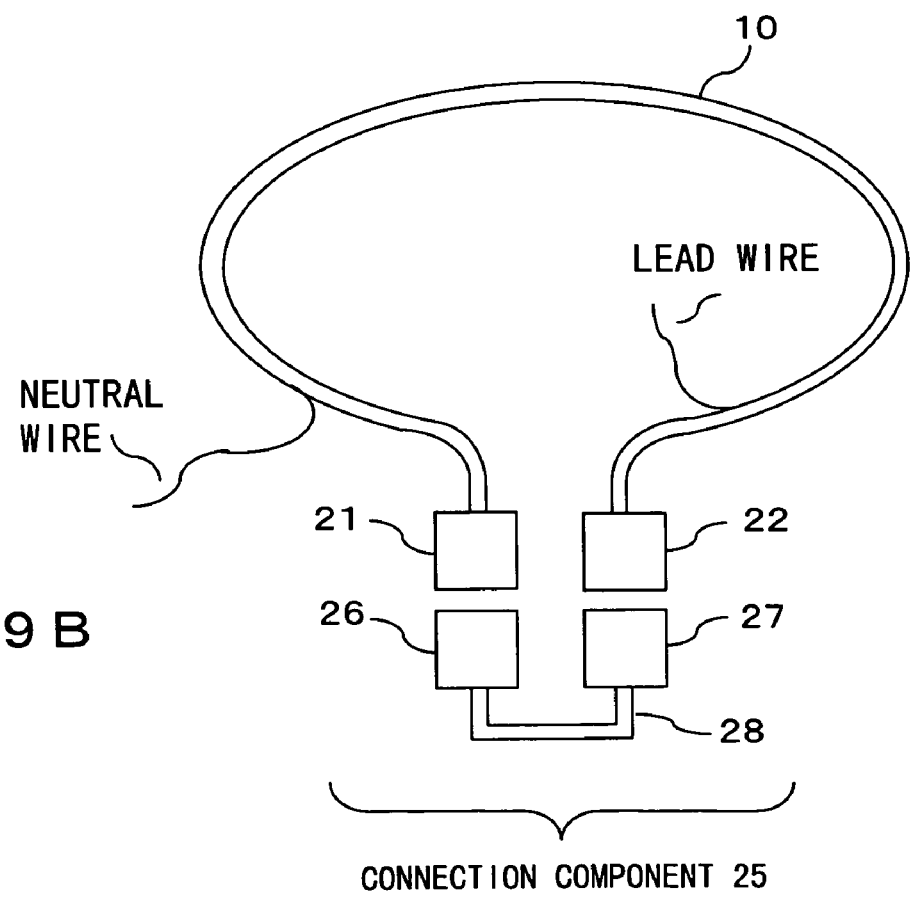

In the example as shown in FIG. 9B, both ends of the cable component 10 are connected using a connection component 25. Here, the connection part 25 includes connectors 26 and 27 and a conversion cable 28, and it functions the same way as that of the connector 23 as shown in FIG. 8. Accordingly, when the connection component 25 connects the connectors 21 and 22, a coil is obtained.

In addition, before the cable component 10 is inserted into the slot of a stator core, an insulation processing may be performed for the cable component 10. The insulation processing is not especially limited here but this processing may be a processing of covering the cable component 10 contained in the slot with insulating paper, an insulating film, a resin material, etc., for example, when the cable component 10 is installed at the stator core. If such procedures are introduced, the insulating paper, etc. need not be inserted in advance into the corresponding slot of the stator core, and the insulation between the coil and the stator core can be acquired only by inserting the insulated cable component 10 into the corresponding slot. In addition, the alignment of a plurality of conductor wires 11 for forming the cable component 10 can be maintained by performing such an insulation processing.

Figure 10A:
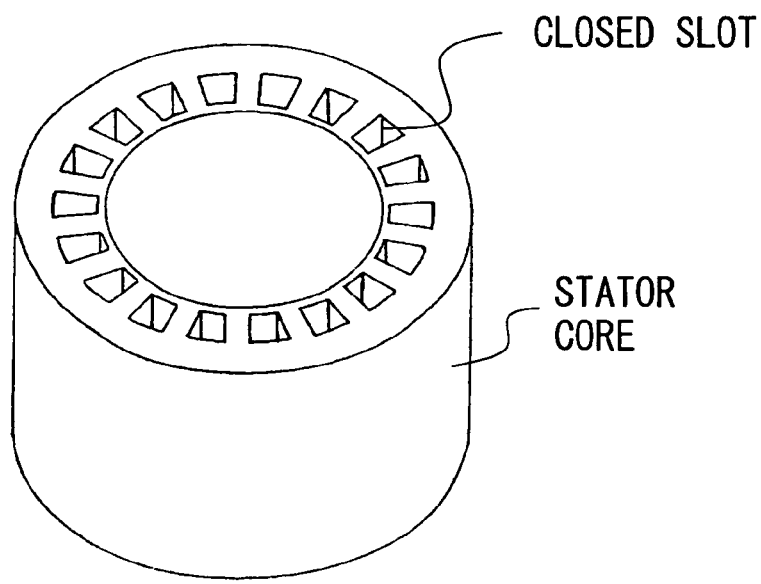
FIGS. 10A and 10B show embodiment in a case where the present invention is applied to the stator of a closed slot.
Figure 10B:
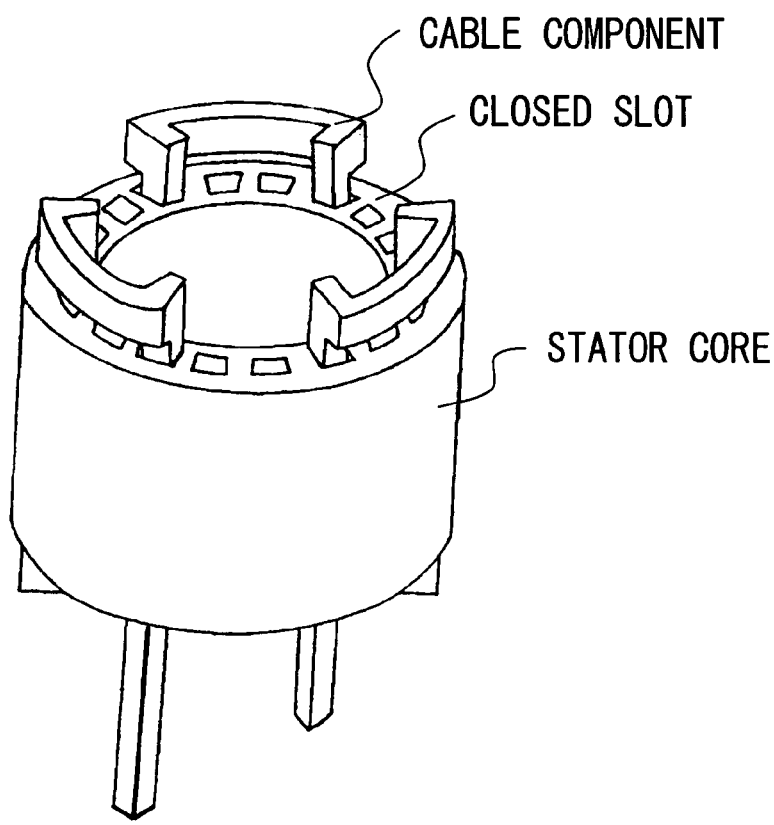

In the above-mentioned embodiment of the present invention, the slot provided at the stator core is an open slot, but the present invention is not limited to such a slot. That is, the present invention may be applied to a stator core having a closed core as shown in FIG. 10A. An "open slot" indicates a configuration in which a slot is open in the outer-circumference direction of a stator core (refer to FIG. 4) or a slot is open in the inner-circumference direction of a stator core (refer to FIG. 3). On the other hand, a "closed slot" indicates a configuration in which a slot is open neither in the outer-circumference direction nor in the inner-circumference direction of a stator core and this slot is realized by a through bore for enabling a conductor wire to pass through therein. In the case where the present invention is applied to a closed slot, the cable component 10 is installed at a stator core in such a way that the cable component sequentially penetrates a plurality of corresponding closed slots as shown in FIG. 10B. Then, connectors are provided at both ends of the cable component 10 and the set of these connectors are connected to each other.

In the case where the slot provided at a stator core is a semi-closed slot (the slot is open in the outer-circumference direction or in the inner-circumference direction but the aperture width of the slot is narrower than the width in the circumference direction in the slot), the present invention may be applied in the same way as the case of a closed slot.

Furthermore, the rotating electrical unit is not limited to a three-phase rotating electrical unit and the number of poles of each phase is not limited to "6". For example, if the number of poles of each phase is "4", the cable component 10 crosses four slots, and if the number of poles of each phase is "8", the cable component 10 crosses eight slots.

In the above-mentioned embodiment, the present invention is applied to a rotating electrical unit (especially, an armature thereof), but it may be also applied to a linear motor and an induction machine (especially, armatures thereof). Meanwhile, the armature includes an armature iron core and a coil, generates an electro motive force and functions as a part for flowing a main electric current therein. The present invention is widely applied to an armature used for a rotating electrical unit, a linear motor and an induction machine.

What is claimed is:

1. A motor including an armature wound by a one conductor wire, wherein the armature comprising:
   an armature iron core provided with a plurality of slots; and
   a cable component having a set of connectors at both ends of said cable component,
   wherein said cable component is formed by bundling a plurality of conductor wires being insulated each other, a length of each of the conductor wires being approximately the same, and is inserted into a slot so as to cross over the plurality of slots provided at the armature iron core, and
   wherein said set of connectors electrically connects ends of the plurality of conductor wires in such a way that each of the plurality of conductor wires is serially connected.

2. The motor according to claim 1, wherein the motor is a rotating electrical unit.

3. The motor according to claim 1, wherein the plurality of conductor wires are arranged in such a way that a cross-section shape of the cable component approximately matches with a cross-section shape of the slot.

4. The motor according to claim 1, wherein each of the plurality of conductor wires is a flat conductor wire.

5. An armature comprising:
   an armature iron core provided with a plurality of slots; and
   a cable component having a set of connectors at both ends of said cable component,
   wherein said cable component is formed by bundling a plurality of conductor wires being insulated each other, a length of each of the conductor wires being approximately the same, and is inserted into a slot so as to cross over the plurality of slots provided at the armature iron core, and
   wherein said set of connectors electrically connects ends of the plurality of conductor wires in such a way that each of the plurality of conductor wires is serially connected.

6. A generator including an armature wound by a one conductor wire, wherein the armature comprising:
   an armature iron core provided with a plurality of slots; and
   a cable component having a set of connectors at both ends of said cable component,
   wherein said cable component is formed by bundling a plurality of conductor wires being insulated each other, a length of each of the conductor wires being approximately the same, and is inserted into a slot so as to cross over the plurality of slots provided at the armature iron core, and
   wherein said set of connectors electrically connects ends of the plurality of conductor wires in such a way that each of the plurality of conductor wires is serially connected.

7. The motor according to claim 1, wherein each of the slots is open in the outer-circumference direction or in the inner-circumference direction, the opening of the slot has a size through which said cable component can be inserted from an inner-circumference side or an outer-circumference side of the slots.

8. The armature according to claim 5, wherein each of the slots is open in the outer-circumference direction or in the inner-circumference direction, the opening of the slot has a size through which said cable component can be inserted from an inner-circumference side or an outer-circumference side of the slots.

9. The armature according to claim 6, wherein each of the slots is open in the outer-circumference direction or in the inner-circumference direction, the opening of the slot has a size through which said cable component can be inserted from an inner-circumference side or an outer-circumference side of the slots.

10. The motor according to claim 3, wherein a cross-sectional shape of each of the slots is trapezoidal.

* * * * *

UNITED STATES PATENT AND TRADEMARK OFFICE
CERTIFICATE OF CORRECTION

PATENT NO.       : 7,256,521 B2
APPLICATION NO.  : 10/965320
DATED            : August 14, 2007
INVENTOR(S)      : Hiroshi Fukasaku et al.

It is certified that error appears in the above-identified patent and that said Letters Patent is hereby corrected as shown below:

On the Title page, item (57); in the Abstract, line 4, please delete "into corresponding slot" and insert therefore --into a corresponding slot--;

Column 2, line 20, please delete "in such away" and insert therefore --in such a way--;

Column 2, lines 21, 29, 47-48 and 67, please delete "cross-section shape" and insert therefore --cross-sectional shape--;

Column 3, lines 58, 60, 63, 65 and 66, please delete "cross-section shape" and insert therefore --cross-sectional shape--;

Column 4, lines 9, 14-15, 17, 35, 59 and 66, please delete "cross-section shape" and insert therefore --cross-sectional shape--;

Column 4, line 36, please delete "approximately rectangle" and insert therefore --approximately rectangular--;

Column 4, lines 42-43, please delete "factor of conductor wires" and insert therefore --factor of the conductor wires--;

Column 5, lines 2, 4-5, 7 and 9, please delete "cross-section shape" and insert therefore --cross-sectional shape--;

Column 6, line 60, please delete "cross-section shape" and insert therefore --cross-sectional shape--;

Column 6, line 63, please delete "efficiency of rotating electrical unit" and insert therefore --efficiency of the rotating electrical unit--; and Column 7, line 19, please delete "processing of covering" and insert therefore --process of covering--.

UNITED STATES PATENT AND TRADEMARK OFFICE
CERTIFICATE OF CORRECTION

PATENT NO. : 7,256,521 B2
APPLICATION NO. : 10/965320
DATED : August 14, 2007
INVENTOR(S) : Hiroshi Fukasaku et al.

It is certified that error appears in the above-identified patent and that said Letters Patent is hereby corrected as shown below:

In the Claims

In Claim 3, column 8, lines 27 and 28, please delete "cross-section shape" and insert therefore --cross-sectional shape--.

Signed and Sealed this

Eighth Day of September, 2009

David J. Kappos
*Director of the United States Patent and Trademark Office*